(12) United States Patent
Chang et al.

(10) Patent No.: US 12,441,606 B2
(45) Date of Patent: Oct. 14, 2025

(54) MEMS DEVICE INCLUDING COIL STRUCTURE WITH CORRUGATED POLYMER FILM

(71) Applicant: UNITED MICROELECTRONICS CORP., Hsinchu (TW)

(72) Inventors: Jung-Hao Chang, Taoyuan (TW); Weng-Yi Chen, Hsinchu County (TW)

(73) Assignee: UNITED MICROELECTRONICS CORP., Hsinchu (TW)

( * ) Notice: Subject to any disclaimer, the term of this patent is extended or adjusted under 35 U.S.C. 154(b) by 270 days.

(21) Appl. No.: 18/075,882

(22) Filed: Dec. 6, 2022

(65) Prior Publication Data

US 2024/0158225 A1    May 16, 2024

(30) Foreign Application Priority Data

Nov. 11, 2022   (TW) .................................. 111143258

(51) Int. Cl.
  *B81B 7/02* (2006.01)
  *B81C 1/00* (2006.01)

(52) U.S. Cl.
  CPC ............ *B81C 1/00476* (2013.01); *B81B 7/02* (2013.01); *B81B 2201/0257* (2013.01); *B81B 2203/0315* (2013.01); *B81B 2203/033* (2013.01); *B81B 2203/0353* (2013.01); *B81B 2207/01* (2013.01); *B81C 2201/0108* (2013.01); *B81C 2201/0132* (2013.01); *B81C 2201/0133* (2013.01); *B81C 2201/014* (2013.01); *B81C 2201/0176* (2013.01)

(58) Field of Classification Search
  CPC ........... H04R 13/00; H04R 9/047; H04R 7/02
  See application file for complete search history.

(56) References Cited

U.S. PATENT DOCUMENTS

| | | |
|---|---|---|
| 7,851,975 B2 | 12/2010 | Lan |
| 7,898,081 B2 | 3/2011 | Lan |
| 8,134,215 B2 | 3/2012 | Shih |
| 8,208,662 B2 | 6/2012 | Chen |
| 8,345,895 B2 | 1/2013 | Chen |
| 8,486,587 B2 | 7/2013 | Tsai et al. |
| 8,936,960 B1 | 1/2015 | Wang |
| 9,275,933 B2 | 3/2016 | Kuo et al. |
| 9,499,399 B2 | 11/2016 | Chen |
| 9,580,299 B2 | 2/2017 | Dehe |
| 9,624,092 B1 * | 4/2017 | Fang .................. B81C 1/00801 |
| 9,668,064 B2 | 5/2017 | Hsu |
| 9,728,653 B2 | 8/2017 | Dehe |
| 9,748,139 B1 | 8/2017 | Liou et al. |
| 9,761,791 B2 | 9/2017 | Shiu et al. |

(Continued)

OTHER PUBLICATIONS

Chrusch et al. "Corrugated Mircromachined Membrane Structures", pp. 445-449, Aug. 30, 2022, IEEE.

*Primary Examiner* — Ida M Soward
(74) *Attorney, Agent, or Firm* — WPAT, PC

(57) ABSTRACT

A micro electro mechanical system (MEMS) device and a method for manufacturing the same are provided. The MEMS device includes a substrate, a polymer film on the substrate and having a lower surface facing toward the substrate, a cavity passing through the substrate, and coil structures on the substrate and in the polymer film. The polymer film includes a corrugation pattern on the lower surface of the polymer film. A portion of the polymer film is exposed in the cavity.

8 Claims, 7 Drawing Sheets

(56) References Cited

U.S. PATENT DOCUMENTS

| | | | |
|---|---|---|---|
| 9,950,920 B2 | 4/2018 | Lin | |
| 10,090,465 B2 | 10/2018 | Hsu et al. | |
| 10,111,021 B2 | 10/2018 | Deas | |
| 10,442,683 B2 | 10/2019 | Saxena | |
| 10,737,932 B2 | 8/2020 | Lin | |
| 11,312,616 B1* | 4/2022 | Hsieh | H04R 19/04 |
| 12,103,845 B2* | 10/2024 | Chang | H04R 19/04 |
| 2010/0072561 A1* | 3/2010 | Lee | B81C 1/00246 |
| | | | 257/E21.257 |
| 2010/0072860 A1* | 3/2010 | Kim | H10N 30/074 |
| | | | 29/25.35 |
| 2010/0330722 A1* | 12/2010 | Hsieh | G01P 15/125 |
| | | | 257/E21.211 |
| 2011/0182450 A1* | 7/2011 | Chung | H04R 17/005 |
| | | | 29/25.35 |
| 2011/0300659 A1* | 12/2011 | Hsieh | B81C 1/00246 |
| | | | 257/E21.249 |
| 2013/0264663 A1* | 10/2013 | Dehe | B81B 3/0051 |
| | | | 257/416 |
| 2014/0367805 A1* | 12/2014 | Chen | B81C 1/00595 |
| | | | 438/53 |
| 2016/0229692 A1 | 8/2016 | Lin | |
| 2019/0023562 A1* | 1/2019 | Fueldner | B81C 1/00182 |
| 2021/0070610 A1* | 3/2021 | Lee | B81C 1/00158 |
| 2021/0238030 A1* | 8/2021 | Cheng | B81C 1/00357 |
| 2023/0406692 A1* | 12/2023 | Chang | B81B 3/0021 |

* cited by examiner

MEMS DEVICE INCLUDING COIL STRUCTURE WITH CORRUGATED POLYMER FILM

This application claims the benefit of Taiwan application Serial No. 111143258, filed Nov. 11, 2022, the subject matter of which is incorporated herein by reference.

BACKGROUND

Technical Field

The disclosure relates to a micro electro mechanical system (MEMS) device and a method for manufacturing the same, and more particularly to a MEMS device including a corrugation pattern and a method for manufacturing the same.

Description of the Related Art

MEMS components are micro-components produced by combining electronics technology and mechanical engineering technology, and usually include functions such as sensing, processing and/or actuation. MEMS components have been widely used in the field of consumer electronics. Taking speakers as an example, the application of MEMS components to speakers can result in speakers with smaller volume, lower power consumption and higher reliability. Because of these advantages, engineers consider MEMS speakers as a viable alternative. However, the performance of existing MEMS speakers is still insufficient.

It is desirable to provide an MEMS speaker with improved performance.

SUMMARY

The present disclosure relates to a MEMS device and a method for manufacturing the same for improving the performance of the MEMS device.

According to an embodiment of the present disclosure, a MEMS device is provided. The MEMS device includes a substrate, a polymer film on the substrate, a cavity passing through the substrate and coil structures on the substrate and in the polymer film. The polymer film has a lower surface facing toward the substrate. The polymer film includes a corrugation pattern on the lower surface of the polymer film. A portion of the polymer film is exposed in the cavity.

According to another embodiment of the present disclosure, a method for manufacturing a MEMS device is provided. The method includes the following steps. Providing a substrate. Forming coil structures on the substrate. Forming a dielectric layer on the substrate and the coil structures. Removing a first portion of the dielectric layer to form a sacrificing corrugation pattern adjacent to the coil structures. Forming a polymer film on the dielectric layer, wherein the polymer film covers the sacrificing corrugation pattern of the dielectric layer.

The above and other embodiments of the disclosure will become better understood with regard to the following detailed description of the non-limiting embodiment(s). The following description is made with reference to the accompanying drawings.

DETAILED DESCRIPTION

The illustrations may not be necessarily drawn to scale, and there may be other embodiments of the present disclosure which are not specifically illustrated. Thus, the specification and the drawings are to be regard as an illustrative sense rather than a restrictive sense. Moreover, the descriptions disclosed in the embodiments of the disclosure such as detailed construction, manufacturing steps and material selections are for illustration only, not for limiting the scope of protection of the disclosure. The steps and elements in details of the embodiments could be modified or changed according to the actual needs of the practical applications. The disclosure is not limited to the descriptions of the embodiments. The illustration uses the same/similar symbols to indicate the same/similar elements.

Moreover, use of ordinal terms such as "first", "second", "third", etc., in the specification and claims to modify an element or a step does not by itself connote any priority, precedence, or order of one claim element or step over another, but are used merely as labels to distinguish one claim element or step having a certain name from another element or step having the same name (but for use of the ordinal term) to distinguish the claim elements or steps.

Figure 1:
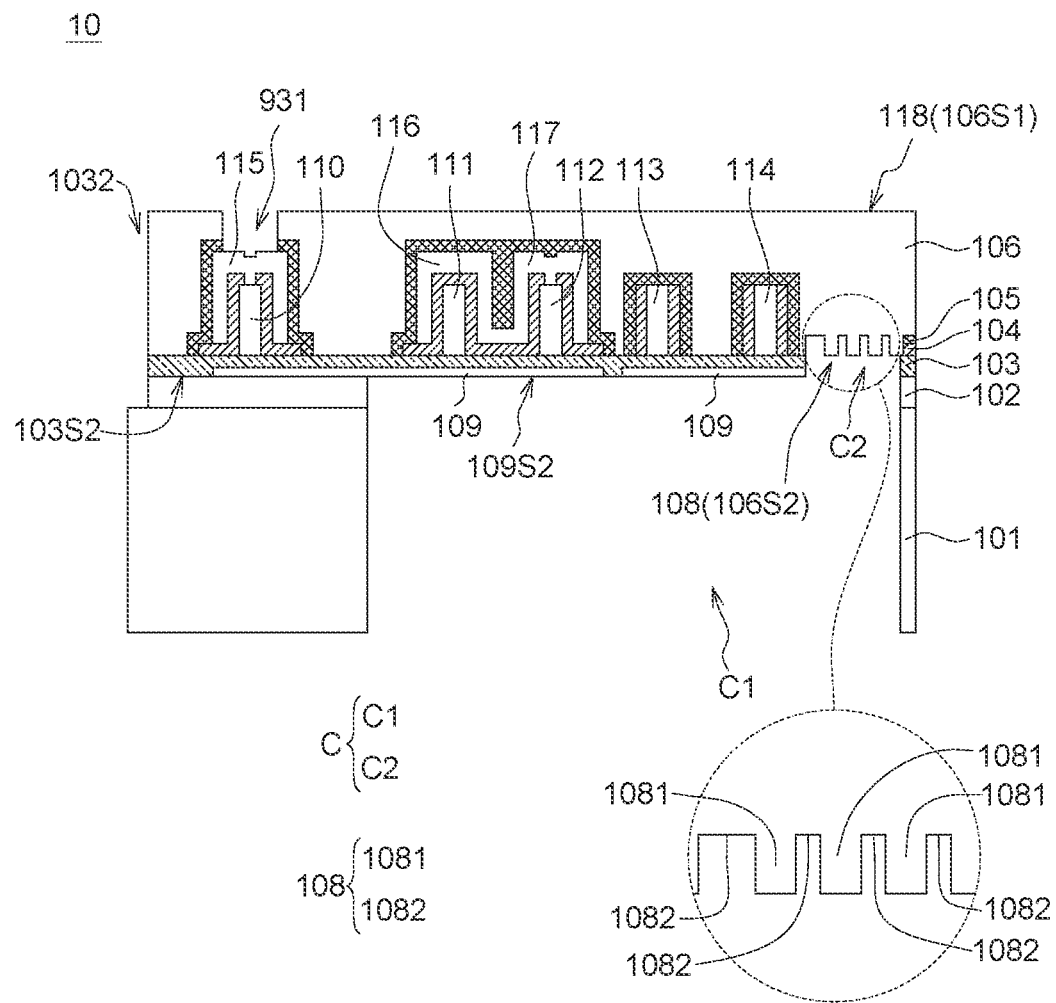
FIG. 1 illustrates a schematic sectional view of a MEMS device according to an embodiment of the present disclosure.

FIG. 1 illustrates a schematic sectional view of a MEMS device 10 according to an embodiment of the present disclosure. For example, the MEMS device 10 may be a MEMS speaker. The MEMS device 10 includes a substrate 101, an oxide layer 102, a first dielectric layer 103, a second dielectric layer 104, a third dielectric layer 105, a polymer film 106, coil structures 110~117, a metal layer 109, and a cavity C. The oxide layer 102 and the first dielectric layer 103 may include different materials.

The oxide layer 102, the first dielectric layer 103 and the polymer film 106 are disposed on the substrate 101 along a longitudinal direction. For example, the longitudinal direction is a normal direction to an upper surface of the substrate 101. The oxide layer 102 is between the first dielectric layer 103 and the substrate 101. The first dielectric layer 103 is between the polymer film 106 and the substrate 101. The coil structures 110~114 are on the substrate 101 and the first dielectric layer 103. A portion of the second dielectric layer 104 may be on sidewalls of the coil structures 110~114. A portion of the second dielectric layer 104 may cover an upper surface of the coil structure 111. A portion of the second dielectric layer 104 may partially cover upper surfaces of the coil structure 110 and coil structure 112. The coil structure 115 is on the coil structure 110 and the second dielectric layer 104. The coil structure 116 is on the coil structure 111 and the second dielectric layer 104. The coil structure 117 is on the coil structure 112 and the second dielectric layer 104. The coil structures 115~117 may be in the polymer film 106. The third dielectric layer 105 is on the first dielectric layer 103. A portion of the third dielectric layer 105 may be on sidewalls of the coil structures 115~117. A portion of the third dielectric layer 105 may cover upper surfaces of the coil structure 116 and coil structure 117. A portion of the third dielectric layer 105 may partially cover an upper surface of the coil structure 115. The metal layer 109 is between the substrate 101 and the polymer film 106. The metal layer 109 may be on the first dielectric layer 103. The coil structures 110~117 may be coupled to a control circuit (not shown). The control circuit may control electric currents flowing through the coil structures 110~117.

The polymer film 106 is disposed on the substrate 101 and may vibrate relative to the substrate 101. For example, the polymer film 106 vibrates up and down in the longitudinal direction. The polymer film 106 can change the vibration mode according to the magnitude and direction of the electrical current flowing through the coil structures 110~117. The polymer film 106 has an upper surface 106S1 and a lower surface 106S2 opposite to the upper surface 106S1. The lower surface 106S2 of the polymer film 106 faces toward the substrate 101. The polymer film 106 includes a corrugation pattern 108 on the lower surface 106S2. The corrugation pattern 108 includes convex portions 1081 and concave portions 1082. In this embodiment, the convex portions 1081 are separated from each other; the concave portions 1082 are separated from each other; the convex portions 1081 and the concave portions 1082 are arranged alternately. The convex portions 1081 protrude toward the cavity C. The upper surface 106S1 of the polymer film 106 includes a flat surface portion 118 overlapping the corrugation pattern 108 along the longitudinal direction. For example, the flat surface portion 118 may be a flat surface or a surface parallel to a lateral direction. The lateral direction is perpendicular to the longitudinal direction. The corrugation pattern 108 may not overlap the coil structures 110~117 in the longitudinal direction. In an embodiment, the corrugation pattern 108 surrounds the coil structures 110~117. For example, the corrugation pattern 10 may be arranged in a circular shape, a rectangular shape, etc., and may be arranged on the periphery of the coil structures. The polymer film 106 may include a hole 931. The bottom of the hole 931 exposes the coil structure 115. The sidewall of the hole 931 may expose the third dielectric layer 105 and the polymer film 106.

The cavity C passes through the substrate 101, the oxide layer 102 and the first dielectric layer 103. The cavity C includes a first cavity part C1 and a second cavity part C2 communicating with each other. The first cavity part C1 passes through the substrate 101 and the oxide layer 102. The second cavity part C2 passes through the first dielectric layer 103. The sidewall of the substrate 101 and the sidewall of the oxide layer 102 are exposed in the first cavity part C1 of the cavity C. A portion of the first dielectric layer 103 and a portion of the metal layer 109 are exposed in the first cavity part C1 of the cavity C. The first dielectric layer 103 has a lower surface 103S2 facing toward the substrate 101. A portion of the lower surface 103S2 of the first dielectric layer 103 is exposed in the first cavity part C1 of the cavity C. The metal layer 109 has a lower surface 109S2 facing toward the substrate 101. A portion of the lower surface 109S2 of the metal layer 109 is exposed in the first cavity part C1 of the cavity C. A portion of the polymer film 106 is exposed in the second cavity part C2 of the cavity C. The corrugation pattern 108 of the polymer film 106 is exposed in the second cavity part C2 of the cavity C. The sidewall of the first dielectric layer 103 and the sidewall of the metal layer 109 are exposed in the second cavity part C2 of the cavity C. A width of the first cavity part C1 in the lateral direction may be different from a width of the second cavity part C2 in the lateral direction. For example, the width of the first cavity part C1 in the lateral direction is greater than the width of the second cavity part C2 in the lateral direction.

The MEMS device 10 may include a trench 1032. The trench 1032 extends along the longitudinal direction. The bottom of the trench 1032 exposes the substrate 101. A sidewall of the trench 1032 exposes the oxide layer 102, the first dielectric layer 103 and the polymer film 106.

FIGS. 2-12 schematically illustrate a method for manufacturing a MEMS device according to an embodiment of the present disclosure.

Figure 2:
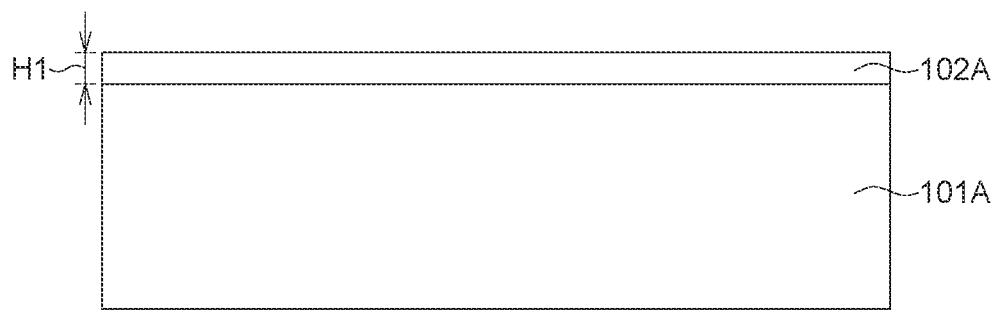
FIGS. 2-12 schematically illustrate a method for manufacturing a MEMS device according to an embodiment of the present disclosure.

In FIG. 2, a substrate 101A is provided. An oxide layer 102A is formed on the substrate 101A. In an embodiment, the oxide layer 102A is formed by oxidizing a portion of the substrate 101A by a thermal oxidation process. In another embodiment, the oxide layer 102A is formed on the substrate 101A by a deposition process, such as a chemical vapor deposition (CVD) process. The substrate 101A may include a semiconductor material, such as silicon. The oxide layer 102A may include an oxidized semiconductor material, such as silicon oxide. In an embodiment, a thickness H1 of the oxide layer 102A along the longitudinal direction is about 4 kA.

Figure 3:
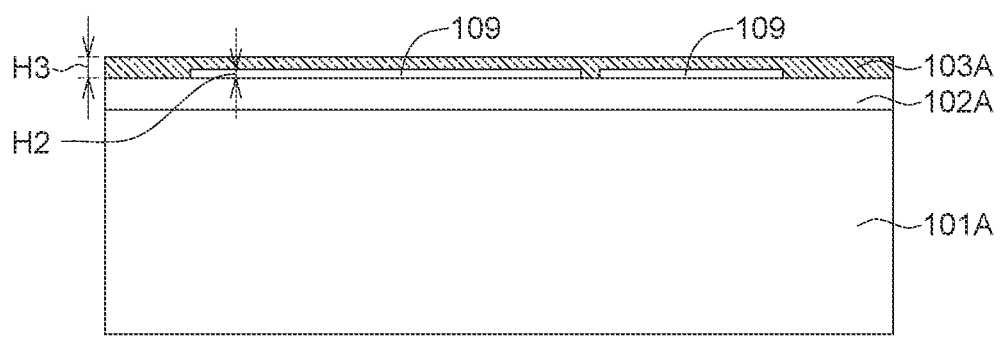

In FIG. 3, a metal layer 109 and a first dielectric layer 103A are formed. The metal layer 109 may be used as an etching stop layer in subsequent steps. The metal layer 109 of FIG. 3 is shown as discontinuous in the lateral direction, but the present disclosure is not limited thereto. In other embodiments, the metal layer 109 may be continuous in the lateral direction. In an embodiment, the metal layer 109 is formed on the oxide layer 102A by a sputtering process or other deposition process, and then the first dielectric layer 103A is formed on the metal layer 109 by a deposition process, such as a chemical vapor deposition process. The metal layer 109 may include aluminum or other suitable metal material. The first dielectric layer 103A may include a dielectric material, such as plasma enhanced tetraethyl orthosilicate (PE-TEOS). In an embodiment, a thickness H2 of the metal layer 109 along the longitudinal direction is about 1 kA. A thickness H3 of the first dielectric layer 103A along the longitudinal direction is about 6 kA.

Figure 4:
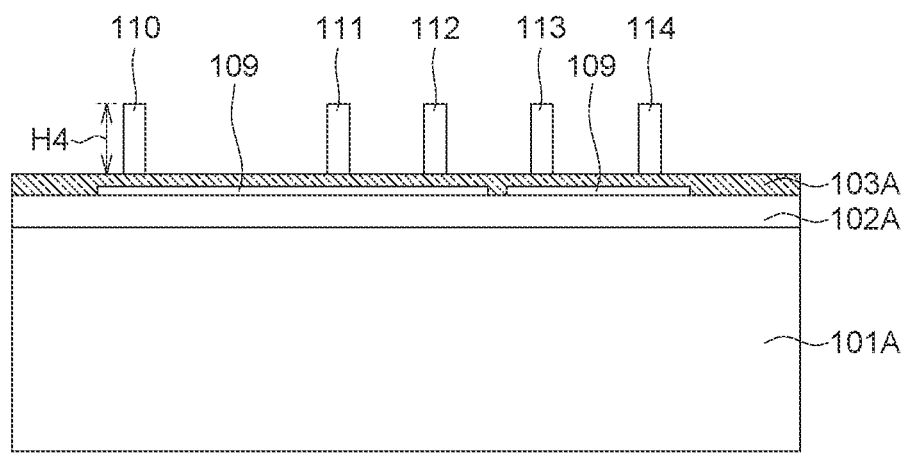
Figure 5:
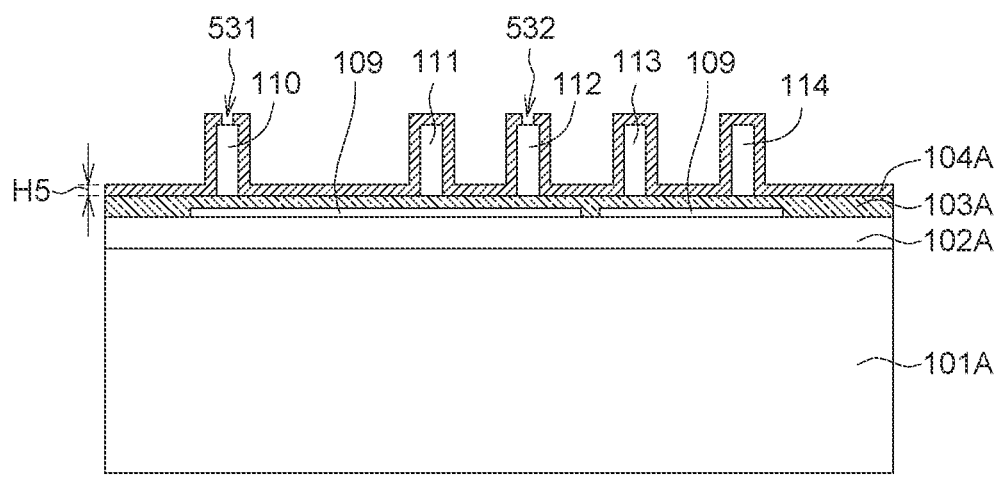

In FIGS. 4-5, coil structures 110~114 and a second dielectric layer 104A are formed on the first dielectric layer 103A. The second dielectric layer 104A may at least partially cover the coil structures 110~114. In an embodiment, the coil structures 110~114 are formed on the first dielectric layer 103A by a sputtering process or other deposition process, and then the second dielectric layer 104A is formed on the first dielectric layer 103A by a deposition process, such as a chemical vapor deposition process. A portion of the second dielectric layer 104A may be removed to form a hole 531 and a hole 532 by an etching process, such as a wet etching process or a dry etching process, or other suitable process. The hole 531 and the hole 532 expose a portion of the upper surface of the coil structure 110 and a portion of the upper surface of the coil structure 112 respectively. The coil structures 110~114 may include conductive materials, such as aluminum, tungsten, etc. The second dielectric layer 104A may include a dielectric material, such as PE-TEOS. In an embodiment, a height H4 of each of the coil structures 110~114 along the longitudinal direction is about 20 kA. A thickness H5 of the second dielectric layer 104A along the longitudinal direction is about 3 kA.

Figure 6:
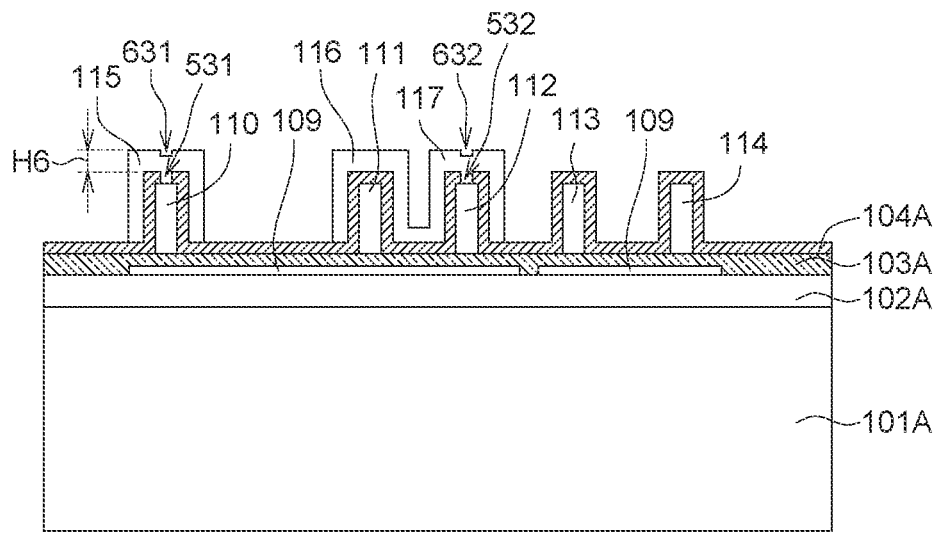

In FIG. 6, coil structures 115~117 are formed on the second dielectric layer 104A. The coil structure 115 is on the coil structure 110. The coil structure 116 is on the coil structure 111. The coil structure 117 is on the coil structure 112. The coil structure 115 may include a recess 631 at least partially overlapping the hole 531 in the longitudinal direction. The coil structure 117 may include a recess 632 at least partially overlapping the hole 532 in the longitudinal direction. In an embodiment, the coil structures 115~117 are formed on the second dielectric layer 104A by a sputtering process or other deposition process. The coil structures 115~117 may include conductive materials, such as aluminum, tungsten, etc. In an embodiment, a height H6 of each of the coil structures 115~117 along the longitudinal direction is about 10 kA.

Figure 7:
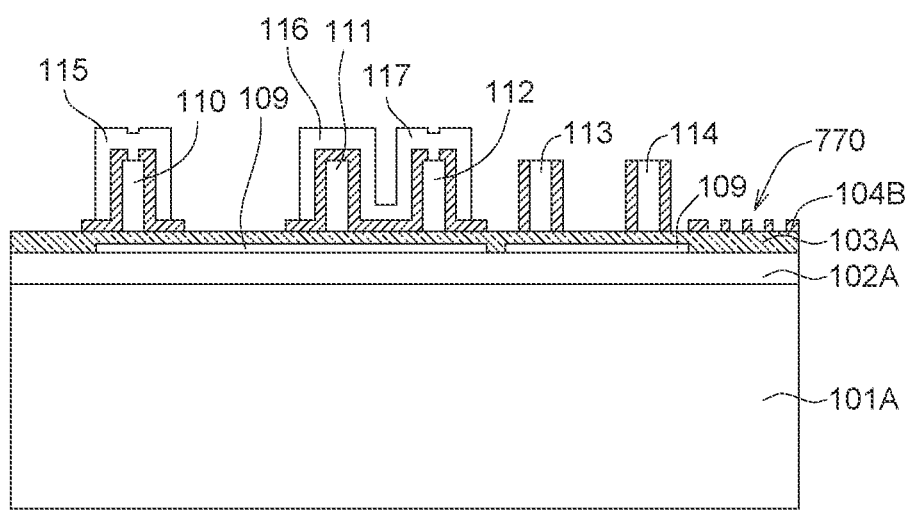

In FIG. 7, a first portion of the second dielectric layer 104A is removed to form a sacrificing corrugation pattern 770 adjacent to the coil structures 113~114. In addition, the step shown in FIG. 7 may include removing a second portion of the second dielectric layer 104A (e.g. the portion of the second dielectric layer 104A on the coil structures 113~114) so as to expose the upper surfaces of the coil structures 113~114, and removing a third portion of the second dielectric layer 104A (e.g. the portion of the second dielectric layer 104A between the coil structures 110~114) so as to expose a portion of the upper surface of the first dielectric layer 103A. The remaining second dielectric layer 104A can be defined as the second dielectric layer 104B. In an embodiment, the first portion, the second portion and the third portion of the second dielectric layer 104A are removed by an etching process, such as a wet etching process or a dry etching process, or other suitable process.

Figure 8:
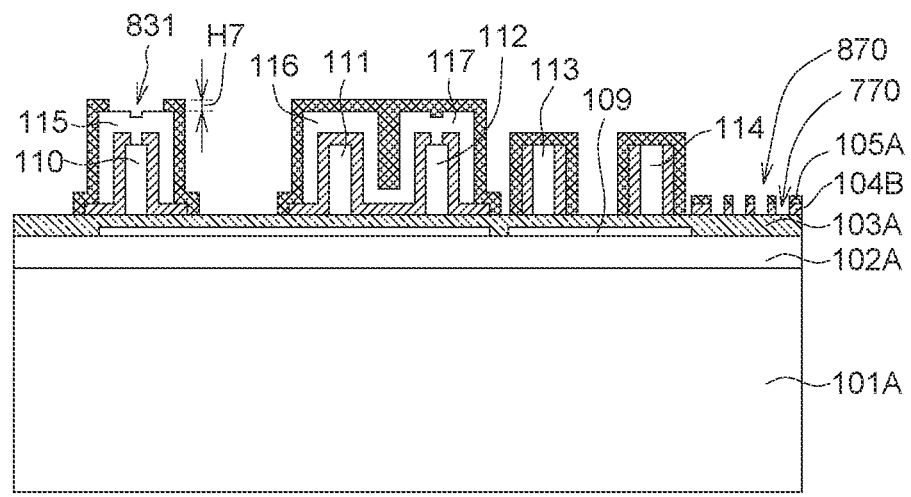

In FIG. 8, a third dielectric layer 105A is formed on the first dielectric layer 103A. A sacrificing corrugation pattern 870 is formed on the sacrificing corrugation pattern 770. The third dielectric layer 105A may cover the coil structures 113, 114, 116 and 117. The third dielectric layer 105A may cover a portion of the coil structure 115. A hole 831 of the third dielectric layer 105A may expose a portion of the upper surface of the coil structure 115. In an embodiment, a third dielectric layer is formed on the structure shown in FIG. 7 by a deposition process, such as a chemical vapor deposition process; the third dielectric layer at this stage may cover the first dielectric layer 103A, the coil structures 113~117 and the second dielectric layer 104B including sacrificing corrugation pattern 770; then, through an etching process, such as a wet etching process or a dry etching process, or other suitable process, a first portion of the third dielectric layer is removed to form the sacrificing corrugation pattern 870 on the sacrificing corrugation pattern 770, a second portion of the third dielectric layer (e.g. the portion of the third dielectric layer on the upper surface of the coil structure 115) is removed to form the hole 831 and expose the upper surface of the coil structure 115, and a third portion of the third dielectric layer (e.g. the portion of the third dielectric layer between the coil structures 115 and 116, the portion of the third dielectric layer between the coil structures 117 and 113, and the portion of the third dielectric layer between the coil structures 113 and 114) is removed to expose a portion of the upper surface of the first dielectric layer 103A. The remaining third dielectric layer can be defined as the third dielectric layer 105A. The third dielectric layer 105A may include a dielectric material, such as PE-TEOS. In an embodiment, a thickness H7 of the third dielectric layer 105A along the longitudinal direction is about 10 kA.

Figure 9:
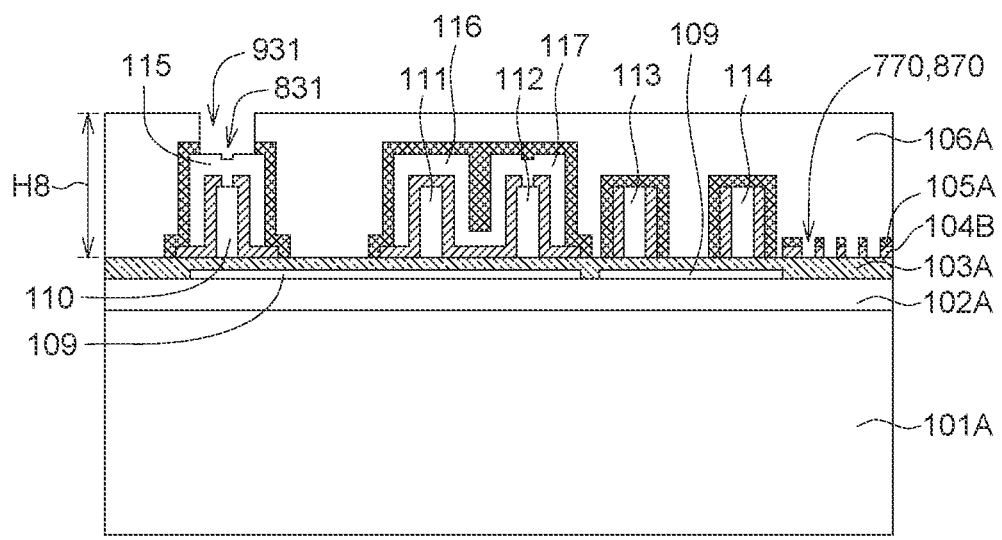

In FIG. 9, a polymer film 106A is formed. The polymer film 106A may cover the first dielectric layer 103A, the third dielectric layer 105A, the sacrificing corrugation pattern 770 and the sacrificing corrugation pattern 870. The polymer film 106A may directly contact the sacrificing corrugation pattern 770 and the sacrificing corrugation pattern 870. The polymer film 106A may directly contact the first dielectric layer 103A. The polymer film 106A may include a hole 931 exposing the coil structure 115. In an embodiment, the polymer film 106A is formed on the third dielectric layer 105A by coating, and then the hole 931 is formed in the polymer film 106A by an etching process, such as a wet etching process or a dry etching process, or other suitable process. The polymer film 106A may include polymer, such as polyimide. In an embodiment, a thickness H8 of the polymer film 106A along the longitudinal direction is about 30 kA.

Figure 10:
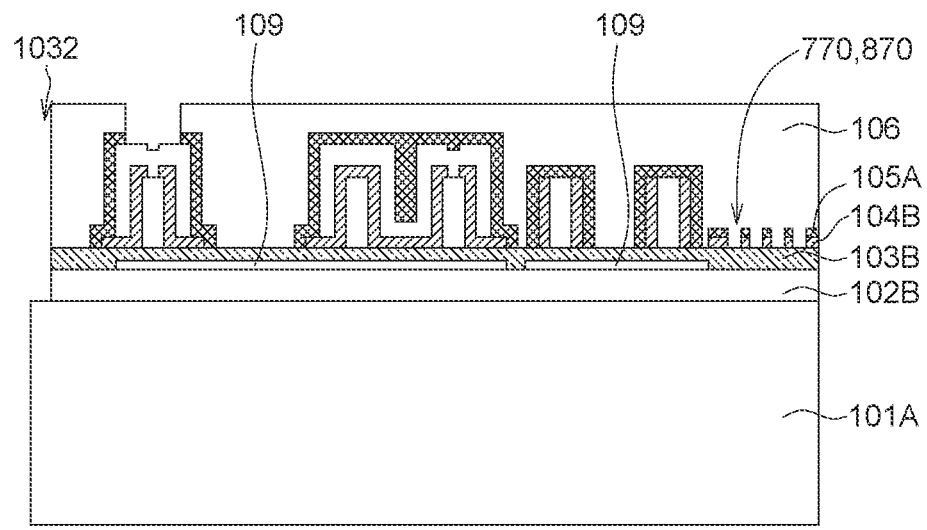

In FIG. 10, a trench 1032 is formed. In an embodiment, a portion of the polymer film 106A, a portion of the first dielectric layer 103A and a portion of the oxide layer 102A are removed to form the trench 1032 by an etching process, such as a wet etching process or a dry etching process, or other suitable process. The remaining polymer film 106A can be defined as the polymer film 106. The remaining first dielectric layer 103A can be defined as the first dielectric layer 103B. The remaining oxide layer 102A can be defined as the oxide layer 102B.

Figure 11:
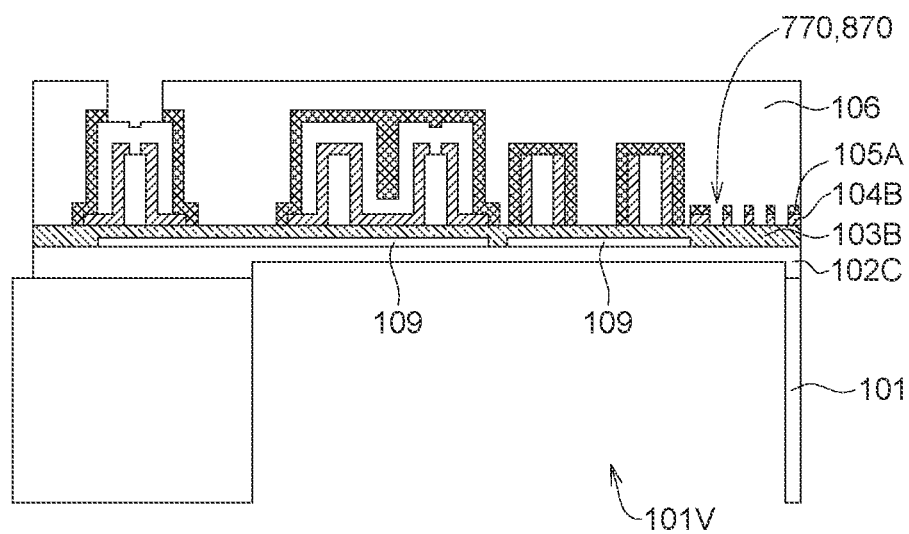

In FIG. 11, a space 101V is formed. The space 101V may expose the oxide layer 102C and the substrate 101. In an embodiment, an etching process, such as a wet etching process or a dry etching process, or other suitable process is applied to the structure shown in FIG. 10, the etching process can be stopped in the oxide layer 102B of FIG. 10, and a portion of the substrate 101A and a portion of the oxide layer 102B are removed to form the space 101V. The remaining substrate 101A can be defined as the substrate 101. The remaining oxide layer 102B can be defined as the oxide layer 102C.

Figure 12:
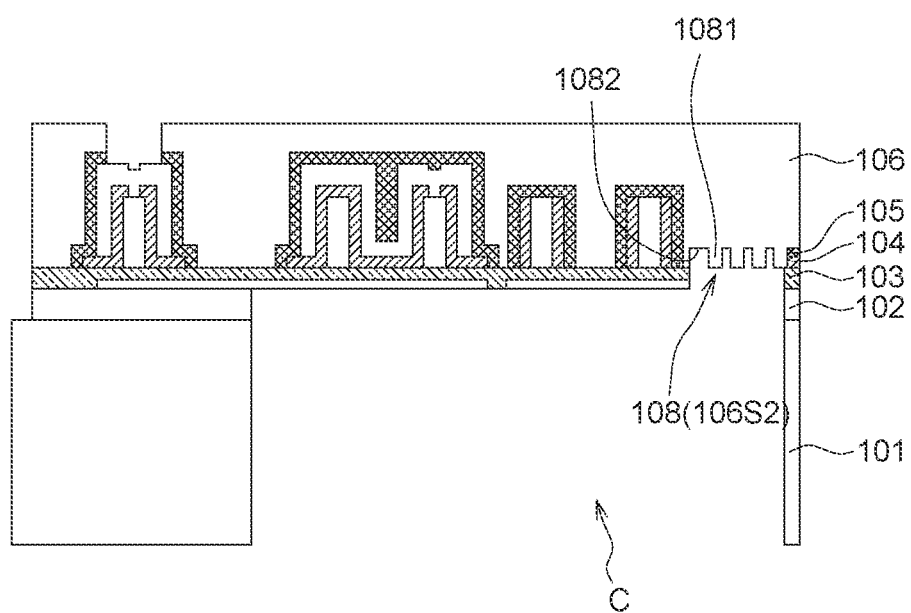

In FIG. 12, a corrugation pattern 108 is formed. In an embodiment, an etching process, such as a wet etching process or a dry etching process, or other suitable process is applied to the structure shown in FIG. 11 to remove a portion of the oxide layer 102C, a portion of the first dielectric layer 103B, a portion of the second dielectric layer 104B, and a portion of the third dielectric layer 105A of FIG. 11 to form the corrugation pattern 108 in the polymer film 106. In this step, the removed portion of the second dielectric layer 104B includes the sacrificing corrugation pattern 770; the removed portion of the third dielectric layer 105A includes the sacrificing corrugation pattern 870. The remaining oxide layer 102C can be defined as the oxide layer 102. The remaining first dielectric layer 103B can be defined as the first dielectric layer 103. The remaining second dielectric layer 104B can be defined as the second dielectric layer 104. The remaining third dielectric layer 105A can be defined as the third dielectric layer 105. The corrugation pattern 108 is formed on the lower surface 106S2 of the polymer film 106. The lower surface 106S2 of the polymer film 106 faces toward the substrate 101. The corrugation pattern 108 may be complementary in shape to the sacrificing corrugation pattern 770 and the sacrificing corrugation pattern 870. For example, the corrugation pattern 108 may include convex portions 1081 and concave portions 1082; the shapes of the concave portions 1082 can be complementary to the shapes of the sacrificing corrugation pattern 770 and the sacrificing corrugation pattern 870; that is, if the sacrificing corrugation pattern 770 and the sacrificing corrugation pattern 870 have curved surfaces, the concave portions 1082 of the corrugation pattern 108 have concave curved surfaces corresponding to the curved surfaces of the sacrificing corrugation pattern 770 and the sacrificing corrugation pattern 870. The depth of the concave portion 1082 in the longitudinal direction may be determined by the sum of the thicknesses of the sacrificing corrugation pattern 770 and the sacrificing corrugation pattern 870 in the longitudinal direction. The size of the corrugation pattern 108 may be adjusted by changing the thicknesses of the sacrificing corrugation pattern 770 and the sacrificing corrugation pattern 870 in the longitudinal direction, and thus the thickness of the polymer film 106 in the longitudinal direction can be adjusted. In an embodiment, the depth of the concave portion 1082 in the longitudinal direction may be approximately equal to the sum of the thicknesses of the sacrificing corrugation pattern 770 and the sacrificing corrugation pattern 870 in the longitudinal direction.

In an embodiment, a MEMS device 10 as shown in FIG. 1 may be provided through the steps schematically illustrated in FIGS. 2-12.

The MEMS device and the method for manufacturing the same according to embodiments of the present disclosure include a polymer film on the substrate and the polymer film includes a corrugation pattern on the lower surface of the polymer film. The thickness of the polymer film can be modified by the corrugation pattern; therefore, the problem of poor sensitivity caused by a polymer film that is too thick can be solved or improved and the sensitivity and performance of the MEMS speaker can be effectively improved. In addition, use of the corrugation pattern ensures that the thickness of the polymer film is maintained in an appropriate range, thereby avoiding the problem of insufficient strength caused by a polymer film that is too thin. Moreover, in comparison with a comparative example in which the corrugated pattern is on the upper surface of the polymer film, having the corrugation pattern on the lower surface of the polymer film can avoid a patterning process applied to the polymer film for forming corrugation pattern. Omitting the patterning process applied to the polymer film for forming the corrugation pattern can avoid damage to the polymer film during the step of removing photoresist in the patterning process, can avoid the problem of inaccurate profile caused by photoresist residue on the polymer film, and can reduce the number of photomasks used in the process. The manufacturing process is simplified and the yield is improved.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A micro electro mechanical system (MEMS) device, comprising:
    a substrate;
    a polymer film on the substrate and having a lower surface facing toward the substrate, wherein the polymer film comprises a corrugation pattern on the lower surface of the polymer film;
    a cavity passing through the substrate, wherein a portion of the polymer film is exposed in the cavity;
    coil structures on the substrate and in the polymer film;
    a dielectric layer between the substrate and the polymer film, wherein the cavity passes through the dielectric layer; and
    an oxide layer between the dielectric layer and the substrate.

2. The MEMS device according to claim 1, wherein the corrugation pattern of the polymer film is exposed in the cavity.

3. The MEMS device according to claim 1, wherein the corrugation pattern of the polymer film comprises convex portions separated from each other, the convex portions protrude toward the cavity.

4. The MEMS device according to claim 1, wherein the polymer film has an upper surface opposite to the lower surface, the upper surface of the polymer film comprises a flat surface portion, and the flat surface portion overlaps the corrugation pattern along a longitudinal direction.

5. The MEMS device according to claim 1, wherein the dielectric layer has a lower surface facing toward the substrate, a portion of the lower surface of the dielectric layer is exposed in the cavity.

6. The MEMS device according to claim 1, wherein the oxide layer and the dielectric layer comprise different materials.

7. The MEMS device according to claim 1, wherein the cavity passes through the oxide layer.

8. The MEMS device according to claim 1, further comprising a metal layer between the substrate and the polymer film, a portion of the metal layer is exposed in the cavity.

* * * * *